United States Patent Office 3,267,712
Patented August 23, 1966

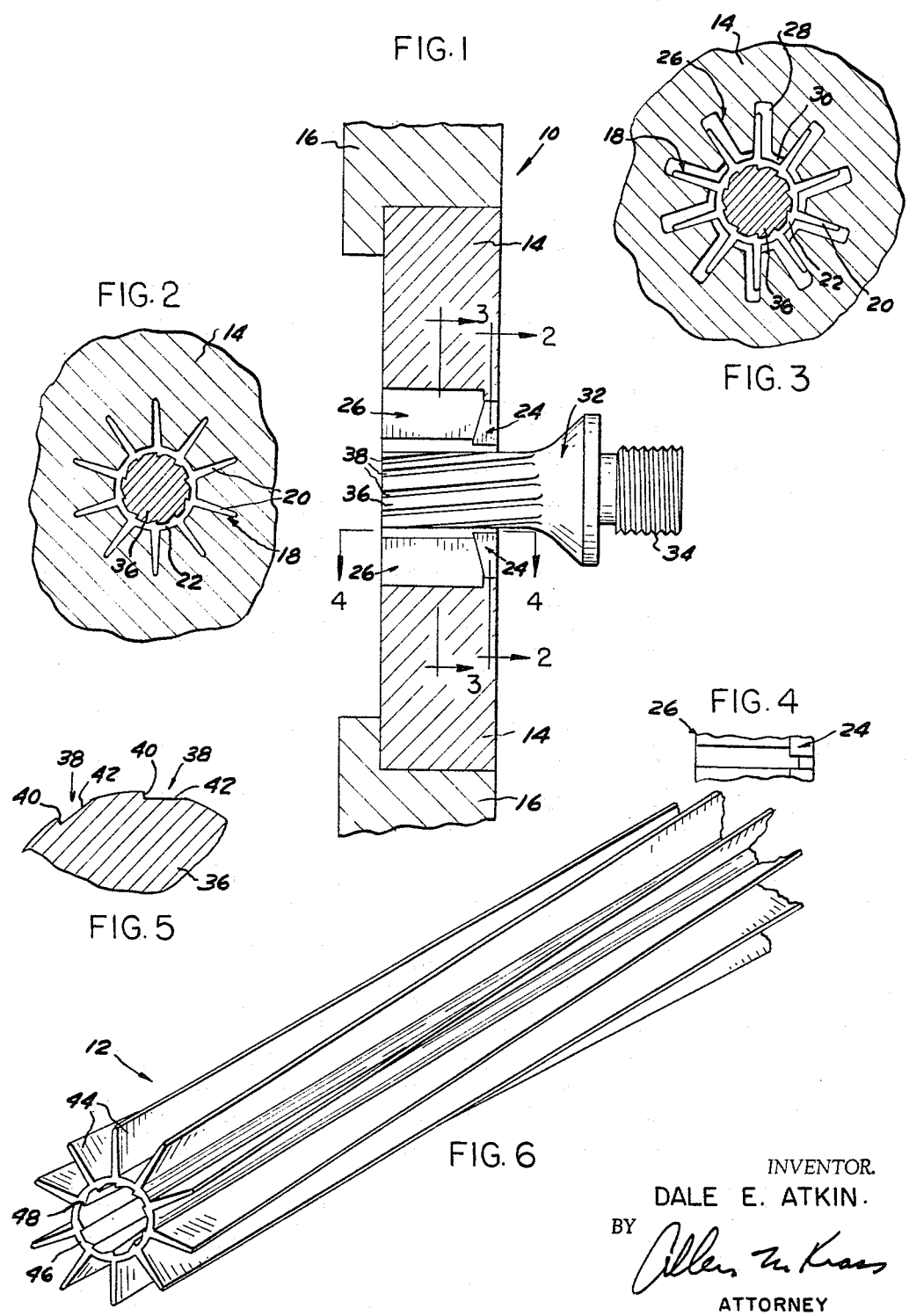

3,267,712
APPARATUS FOR FORMING SPIRALED EXTRUSIONS
Dale E. Atkin, Hudson, Mich., assignor to Purpose Extruded Aluminum, Inc., Hudson, Mich., a corporation of Michigan
Filed Dec. 18, 1963, Ser. No. 331,601
3 Claims. (Cl. 72—260)

This invention relates to extrusion dies and more particularly has reference to extrusion die apparatus for forming tubing having a spiraled outer surface.

The conventional method of extruding tubes consists of applying pressure to a heated billet and thereby forcing it around a mandrel and through a die. The resulting tube has a uniform cross-sectional shape of substantially the same size and configuration as the opening in the die.

Equipment suitable for extrusions of this kind is inadequate, however, when the tube to be formed is characterized by a cross-section that varies uniformly along the length of the tube. One such tube configuration for which extrusion equipment has heretofore been unavailable, is a tube having a spiraling structure or pattern along the length of its outer surface. This tube shape is characterized by a cross-section that appears to successively rotate at successive points along the length of the tube.

It is the principal object of the present invention to provide an extrusion die assembly for forming such spiraled shapes.

In a preferred embodiment of the invention which will subsequently be described in detail, die apparatus for forming a finned tube is shown and comprises an extrusion die, and a mandrel mounted in the die and extending appreciably past the die bearing area. A plurality of spaced tracks are provided in the form of spirals along the length of the mandrel. When the heated metal is forced around the mandrel and through the die, the tracks on the mandrel form corresponding grooves or tracks in the plastic metal. As the solidifying metal moves past the die bearing area and further along the mandrel, the grooves in the metal tend to follow the track on the mandrel, thus producing a rotation of the metal in the same direction as the spiraled track. The die includes a relief or cut-out section to the rear of the die bearing area. This provides space for the fins to rotate as they move through the die.

This advancing rotational movement of the material passing through the die produces a spiraled tube configuration. Thus, the die opening, shaped to form a tube having projecting fins along its circumference, produces a tube having spiraling fins along its entire length. The cross-section of this tube is substantially the same in size and configuration as the opening in the die; however, this cross-section is rotated successively at successive points along the length of the tube.

The tracks along the length of the mandrel may be of extremely small dimensions, thereby having only a very nominal effect on the inner diameter of the tube.

The present invention does not require any equipment for clamping and twisting the tube as it issues from the die. The mandrel tracks provide the necessary rotational movement, the relief sections of the die permitting the formed projections on the tube to rotate as they advance through the die.

Another advantage of the present invention is the simplicity and low cost of fabrication of the apparatus. Since no moving parts are required beyond those employed in conventional extruding equipment, the likelihood of damage to the apparatus is nominal.

A further advantage of the present invention is that it may be employed to extrude tubes of the type described above from any suitable metal, plastic or similar material.

Other objects and advantages of the present invention will be more readily apparent from the following detailed description of a preferred embodiment thereof. The description makes reference to the drawing in which:

FIGURE 1 is a cross-sectional view through the die assembly;

FIGURE 2 is a cross-sectional view taken along the lines 2—2 in FIGURE 1;

FIGURE 3 is a cross-sectional view taken along the lines 3—3 in FIGURE 1;

FIGURE 4 is a cross-sectional view taken along the lines 4—4 in FIGURE 1;

FIGURE 5 is an enlarged detail sectional view of the mandrel; and

FIGURE 6 is a perspective view of the extruded tube formed in the die assembly of FIGURES 1–5.

Referring to the drawing in detail, FIGURE 1 shows a die assembly, generally indicated at 10, for forming tubing having a plurality of fins extending in spiraling manner along its length. The desired tube structure 12 is shown in FIGURE 6.

The construction of the die assembly 10 is illustrated in FIGURES 1–5. A die plate 14 is mounted in a die holder 16. The front of the die plate 14 is provided with a die opening 18, as shown in FIGURE 2, in the form of fin-shaped slots 20 extending radially outward from a circular opening 22.

A small bearing area 24 extends along the length of the die opening 18. A relief section 26 in the die plate 14 extends rearwardly from the die bearing area 24. The relief section 26 is formed with substantially the same configuration as the die opening 18. However, the dimensions of the relief section are somewhat larger than those of the die opening 18. As shown in FIGURE 3, the relief section 26 includes radial slots 28 extending from a circular opening 30. The entire relief section 26 is in a slighty rotated position with respect to the die opening 18.

A mandrel 32 extends through the circular openings 22 and 30 in the die plate. The mandrel includes a threaded rearward end 34 adapted to be supported by suitable means. The forward end 36 of the mandrel 32 extends through the die plate 14 and includes a series of spaced-apart flutes or grooves 38, which extend spirally along the mandrel surface. As shown in FIGURE 5, the grooves 38 are formed by the intersection of a radial plan 40 and a tangent plant 42 cut into the surface of the otherwise cylindrical front end 36 of the mandrel.

In operation, a billet of metal or plastic is positioned at the front of the die assembly and heated by a suitable induction heater. A ram is then moved forward, pressing the billet material against the die plate 14 around the mandrel 32. The heated billet is forced through the die opening 18 along the die bearing area 24. The grooves 38 on the mandrel form corresponding ridges on the soft billet material as the latter moves along the bearing area 24.

The billet material begins immediately to harden somewhat as it passes the bearing area 24. As a result, the ridges formed on the material are stiffened slightly and attempt to follow the spiraling grooves 38 on the mandrel as the material moves forward. This causes the material to rotate as it advances through the die plate.

When the billet material passes through the bearing area 24 of the die plate it has substantially the same size and configuration as the die opening 18. As this formed material reaches the relief section 26 of the die plate and begins to rotate, the fins 44 formed by the slots 20 are moved into the space provided by the relief section 26. The relief section thus affords the space necessary to permit the advancing material to rotate as it moves through the die plate.

FIGURE 6 shows the completed tube structure 12 with its spirally extending fins 44 projecting radially from a hollow cylindrical central structure 46. Ridges 48, formed by the grooves 38 on the surface of the mandrel 32, extend spirally along the interior surface of the hollow structure 46.

The grooves 38 on the mandrel may be considerably reduced in size as compared to those of FIGURE 5 if desired. I have found that the depth of the radial cut 40 may be as small as .005 inch. When the grooves are of such small dimensions, the ridges 48 formed in the tube will be nominal in size. The resulting tube, therefore, will have a substantially smooth inner surface.

It can be seen that the apparatus described above and illustrated in the drawing may be employed to extrude a variety of different tube shapes wherein the tube outer surface has a spiraling projection, groove, or pattern extending the length of the tube.

The present invention is also adaptable for use with any type of material which can be extruded.

Having thus described my invention, I claim:

1. Apparatus for extruding tubing having spiral fins on its outer diameter, comprising:
    a die holder;
    a die plate mounted in said holder having a rear bearing area shaped in substantially the same size and configuration as the cross-section of said tubing and including slots to form the fins in the tubing and a forward section adjacent to a relief section having a shape with somewhat larger dimensions than said rear area and rotated with respect thereto; and a relief section forward of the bearing area having a diameter greater than the bearing area;
    a cylindrical mandrel fixed with respect to the die plate and extending co-axially through the bearing area and the relief area; and a plurality of equally spaced grooves formed on the surface of the mandrel and spiraling along the length of the mandrel within both the bearing area and the relief area of the die plate with a lead substantially equal to that of the slots in the die plate, whereby metal extruded between the die plate and mandrel will mesh with the configuration of the grooves on the mandrel and will be rotated about the axis of the mandrel as it is fed along the mandrel.

2. The apparatus of claim 1 wherein the slots formed in the bearing area of the die plate are spiraled with respect to the axis thereof.

3. The apparatus of claim 2 wherein the lead of the grooves formed on the surface of the mandrel is substantially equal to that of the grooves in the bearing area of the die plate.

References Cited by the Examiner

UNITED STATES PATENTS

| | | | |
|---|---|---|---|
| 659,522 | 9/1900 | Furbish | 72—469 |
| 2,859,869 | 11/1958 | Nolf | 207—17 |
| 2,947,081 | 8/1960 | Clevenger | 72—469 |
| 2,954,121 | 9/1960 | Benson | 207—17 |

FOREIGN PATENTS

| | | |
|---|---|---|
| 336,748 | 3/1904 | France. |
| 881,486 | 4/1943 | France. |

CHARLES W. LANHAM, *Primary Examiner.*

RICHARD J. HERBST, *Examiner.*

H. D. HOINKES, *Assistant Examiner.*